United States Patent [19]

Yokoshima et al.

[11] Patent Number: 4,608,400
[45] Date of Patent: Aug. 26, 1986

[54] NOVEL (METH)ACRYLATE AND RESIN COMPOSITION COMPRISING THE SAME

[75] Inventors: Minoru Yokoshima, Yamaguchi; Tetsuo Ohkubo, Ube; Masayuki Kiyomoto, Yamaguchi, all of Japan

[73] Assignee: Nippon Kayaku Kabushiki Kaisha, Tokyo, Japan

[21] Appl. No.: 752,586

[22] Filed: Jul. 8, 1985

[30] Foreign Application Priority Data

Jul. 23, 1984 [JP] Japan .................. 59-151179

[51] Int. Cl.$^4$ ............ C08F 283/04; C08F 12/24; C07C 69/66
[52] U.S. Cl. .................. 522/96; 525/455; 526/313; 560/185; 522/181
[58] Field of Search ............ 428/268; 526/313; 525/455; 560/185; 522/181, 96

[56] References Cited

U.S. PATENT DOCUMENTS 4,317,895  3/1982  Guagliardo et al. ............ 525/455

FOREIGN PATENT DOCUMENTS 55-160747 12/1980 Japan .
1242980  8/1971 United Kingdom ............ 560/185

OTHER PUBLICATIONS

Chem. Abstracts, vol. 95, entry 42387.

Primary Examiner—Joseph L. Schofer
Assistant Examiner—Peter F. Kulkosky
Attorney, Agent, or Firm—Henry C. Nields

[57] ABSTRACT

A novel (meth)acrylate represented by the general formula [I]:

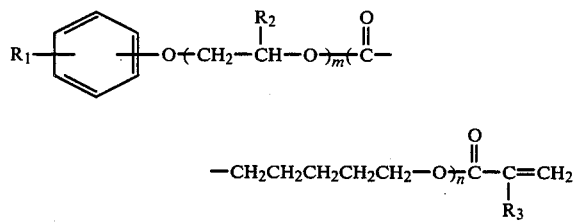

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10 and a resin composition comprising the same.

15 Claims, No Drawings

NOVEL (METH)ACRYLATE AND RESIN COMPOSITION COMPRISING THE SAME

DETAILED DESCRIPTION OF THE INVENTION

The present invention relates to a novel (meth)acrylate and a novel resin composition comprising it, which is particularly useful for coating an optical glass fiber for light transmission.

An optical glass fiber for light transmission is brittle, easily flawed and deficient in flexibility, so that it is easily broken by a weak external force because of such flaws. Therefore, an optical glass fiber has been clad with a resin immediately after the preparation. Epoxy or urethane resins have been used as such a resinous cladding material, but these resins have disadvantages in that the productivity is low, because curing requires a long time and that the transmission characteristics are lowered by lateral pressure because of their low flexibility.

The inventors of the present invention have investigated to overcome the above disadvantages. They have succeeded in synthesizing a novel (meth)acrylate which can be rapidly cured and therefore is useful as a vehicle for ultraviolet-curing printing inks or coating materials and in providing a novel ultraviolet-curing resin composition comprising such a novel (meth)acrylate which can be rapidly cured to give a coating film which is flexible and exhibits a low glass transition temperature and therefore is suitable for cladding an optical glass fiber for light transmission.

The present invention relates to (1) a (meth)acrylate represented by the general formula [I]:

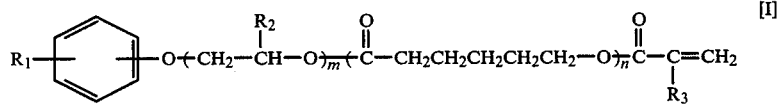

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10, and (2) a resin composition comprising (A) a compound represented by the general formula [I]:

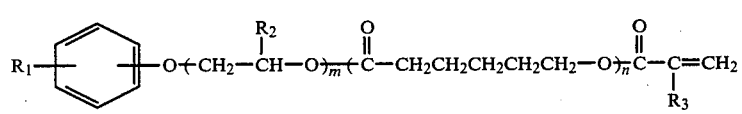

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10, (B) a polyurethane acrylate and (C) a photopolymerization initiator.

The novel compound represented by the general formula [I] can be prepared by esterifying a compound represented by the general formula [II];

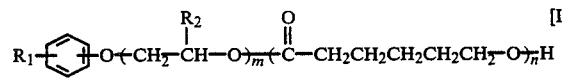

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10, with (meth)acrylic acid. The mean value of m in the general formula [I] is preferably 1 to 5, more preferably 1 to 3, while that of n is preferably 1 to 2. It is preferred that $R_1$ is a hydrogen atom or an alkyl group having 1–10 carbon atoms. It is particularly preferred that $R_1$ is a hydrogen atom or a nonyl or octyl group and that $R_3$ is a hydrogen atom. A particular process for preparing the compound represented by the general formula [I] is as follows: A mixture of 1 mol of a compound represented by the general formula [II], 1.0 to 2.0 mol, preferably 1.1 to 1.5 mol of (meth)acrylic acid, 0.01 to 5% by weight based on the amount of (meth)acrylic acid of an esterification catalyst (for example, p-toluenesulfonic, sulfuric or methanesulfonic acid) and 0.01 to 5% by weight based on the amount of (meth)acrylic acid of a polymerization inhibitor (for example, methoquinone, phenothiazine or hydroquinone) is heated preferably to 70° to 130° C., dehydrated, washed with caustic solution and water successively and distilled to remove low-boiling substances, thus obtaining a compound represented by the general formula [I].

The compound represented by the general formula [II] to be used as a raw material for preparing the compound represented by the general formula [I] can be prepared by reacting ε-caprolactone with an adduct of phenol or its derivative with ethylene oxide or propylene oxide. Examples of the compounds represented by the general formula [II] include reaction products obtained by reacting ε-caprolactone with adducts of phenol or its derivatives, such as cresol, t-butylphenol, nonylphenol, octylphenol or dodecylphenol, with ethylene oxide or propylene oxide.

The polyurethane acrylate (B) to be used in the present invention has an average molecular weight of preferably at least 1000, more preferably 1000 to 10000. Examples of the polyurethane acrylate include polyurethane acrylates of polyetherpolyol having ether linkage in the molecule, polyurethane acrylates of polyesterpolyol having ester linkage in the molecule and polyurethane acrylates having ether and ester linkages in the molecule. Examples of the polyetherpolyol include polypropylene glycol, polyethylene glycol, polytetramethylene glycol, adducts of 1,3-butylene glycol, 1,4-butylene glycol, 1,6-hexanediol, neopentyl glycol, cyclohexanedimethanol, 2,2-bis(4-hydroxycyclohexyl)-propane or bisphenol A with ethylene or propylene oxide. The polyesterpolyol can be prepared by reacting an alcohol component with an acid component. Examples of the alcohol component include polypropylene glycol, polyethylene glycol, polytetramethylene glycol, adducts of 1,3-butylene glycol, 1,4-butylene glycol, 1,6-hexanediol, neopentyl glycol, cyclohexanedimethanol, 2,2-bis(4-hydroxycyclohexyl)propane or bisphenol A with ethylene oxide, propylene oxide or ε-caprolactone. Examples of the acid component include dibasic acids such as adipic, sebacic, azelaic and dodecanedicarboxylic acids and anhydrides thereof. Additionally, products obtained by reacting the above alcohol component with the above acid component and ε-caprolactone simultaneously can be used as the polyesterpolyol. The polyurethane acrylate (B) can be prepared by reacting polyol such as polyetherpolyol, polyesterpolyol or the like with an organic diisocyanate and a hydroxyl group-containing polymerizable monomer until substantially no NCO group remains intact. Examples of the organic diisocyanate include aromatic diisocyanates such as tolylene diisocyanate and 4,4'-diphenylmethane diisocyanate; cycloaliphatic diisocyanates such as isophorone diisocyanate and 4,4'-dicyclohexylmethane diisocyanate, and aliphatic diisocyanates such as hexamethylene diisocyanate and 2,2'-trimethylhexamethylene diisocyanate. Examples of the hydroxyl group-containing polymerizable monomer include (meth)acrylates such as β-hydroxyethyl (meth)acrylate, β-hydroxypropyl (meth)acrylate, β-hydroxylauryl (meth)-acrylate and adducts of β-hydroxyethyl (meth)acrylate with ε-caprolactone. The reaction between the NCO group and the OH group can be carried out in the absence of any catalyst, but may be carried out also in the presence of an ordinary catalyst, for example, tertiary amines such as triethylamine, organometallic compounds such as dibutyltin dilaurate or dibutyltin diacetate, or tin chloride. The amount of the polyurethane acrylate (B) used is preferably not more than 200 parts by weight, more preferably 30 to 200 parts by weight, most preferably 40 to 120 parts by weight per 100 parts by weight of the compound represented by the general formula [I]. The use of too much polyurethane acrylate (B) enhance the viscosity to result in difficult handling. The photopolymerization initiator (C) to be used in the present invention may be any known one, so long as it exhibits a good storage stability after compounding. Examples of the photopolymerization initiator include benzoin alkyl ethers such as benzoin ethyl ether, benzoin isobutyl ether and benzoin isopropyl ether; acetophenones such as 2,2-diethoxyacetophenone and 4'-phenoxy-2,2-dichloroacetophenone; propiophenones such as 2-hydroxyl-2-methylpropiophenone, 4'-isopropyl-2-hydroxy-2-methylpropiophenone and 4'-dodecyl-2-hydroxy-2-methylpropiophenone; benzil dimethyl ketal; 1-hydroxycyclohexylphenyl ketone; anthraquinones such as 2-ethylanthraquinone and 2-chloroanthraquinone and thioxanthone photopolymerization initiators. These photopolymerization initiators (C) may be used alone or as a mixture of two or more of them. The amount of (C) is 0.1 to 10% by weight, preferably 1 to 6% by weight based on the amount of the resin composition. The ultraviolet-curing resin composition of the present invention may further contain, if necessary, a monofunctional unsaturated compound such as 2-hydroxyethyl (meth)-acrylate, 2-hydroxypropyl (meth)acrylate, polyethylene glycol mono(meth)acrylate, polypropylene glycol mono(meth)acrylate, polybutylene glycol mono(meth)acrylate, adducts of β-hydroxyethyl (meth)-acrylate with ε-caprolactone (Placcel FA-1, FM-1; both are products of Daicel Ltd.), esters of (meth)acrylic acid with adducts of tetrahydrofurfuryl alcohol with ε-caprolactone (KAYARAD TC-110S, KAYARAD TC-120; both are products of Nippon Kayaku Co., Ltd.), phenoxyethyl (meth)acrylate of N-vinylpyrrolidone; or a difunctional unsaturated compound such as polyethylene glycol di(meth)acrylate, polypropylene glycol di(meth)acrylate. The amount of such a compound is preferably at most 50% by weight based on the total amount of (A), (B) and (C). The resin composition of the present invention may further contain, if necessary, modifier resins or various additives. Examples of the modifier resin include epoxy resins, polyurethanes, polybutadiene, polyether, polyamidimide, silicone resins and phenolic resins. Examples of the additive include organosilicon compounds, surfactants and polymerization inhibitors. Particularly, examples of the polymerization inhibitor include methylhydroquinone, methoquinone, hydroquinone and naphthoquinone and the amount of the inhibitor used is preferably at most 1% by weight based on the resin composition.

The resin composition of the present invention is useful particularly for cladding an optical glass fiber.

An optical glass fiber is preferably clad with the resin composition of the present invention, particularly by die coating method.

In cladding an optical glass fiber with the resin composition of the present invention, the thickness of the cladding film is preferably from 20 to 300μ, though not necessarily limited.

The resin composition of the present invention can be easily cured by ultraviolet-light irradiation. The curing of the resin composition of the present invention by ultraviolet light irradiation can be carried out according to an ordinary method, for example, by the use of low-voltage or high-voltage mercury vapor lamp, xenon lamp or the like.

The resin composition of the present invention can be also used as ultraviolet-curing adhesive for laminated glass, fiber treatment agent or the like.

[EXAMPLE]

The present invention will be described by the following Examples in more detail. In Examples, all "parts" are by weight.

Synthetic examples of the compound (A) represented by the general formula [I].

SYNTHETIC EXAMPLE 1

706 parts of a reaction product between phenoxyethyl alcohol and ε-caprolactone, represented by the formula:

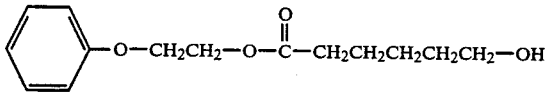

242.2 parts of acrylic acid, 7.3 parts of sulfuric acid, 2.0 parts of hydroquinone, 560 parts of benzene and 140 parts of cyclohexane were placed in a 2 l reactor fitted with a stirrer, a thermostat, a thermometer and a condenser. The content was heated under reflux, while the generated water was separated from the solvent by a separator and taken out of the system and the solvent was recycled to the reactor.

When 50.4 parts of water was generated, the reaction mixture was cooled. The reaction temperature was 80° to 87° C. The reaction mixture was dissolved in a mixture of 1040 parts of benzene and 260 parts of cyclohexane. The solution was neutralized with 20% aqueous causic soda, washed with 500 parts of a 20% aqueous solution of common salt three times and distilled under a reduced pressure to remove the solvent, thus obtaining 786 parts of a pale yellow liquid. This liquid had the following characteristics:

| | |
|---|---|
| specific gravity (25° C.) | 1.103 |
| viscosity (25° C.) | 38.4 CPS |
| saponification value | 365.9 mgKOH/g |
| acid value | 0.03 mgKOH/g |
| refractive index (20° C.) | 1.5026 |
| elemental analysis | C (%)    H (%) |
| | 66.51    7.21 |

The obtained product was analyzed by high-resolution nuclear magnetic resonance (NMR). The results of the measurement of absorption frequency are as follows:

| No. | Absorption frequency (Hz) |
|---|---|
| 1 | 11740.7 |
| 2 | 11732.9 |
| 3 | 11246.0 |
| 4 | 11236.1 |
| 5 | 10728.2 |
| 6 | 8882.9 |
| 7 | 8833.3 |
| 8 | 8765.0 |
| 9 | 8701.1 |
| 10 | 8671.4 |
| 11 | 8199.8 |
| 12 | 7759.2 |
| 13 | 7757.0 |
| 14 | 5259.4 |
| 15 | 5227.5 |
| 16 | 5195.5 |
| 17 | 4456.3 |
| 18 | 4453.0 |
| 19 | 4351.7 |
| 20 | 4336.2 |
| 21 | 4259.1 |
| 22 | 4242.6 |
| 23 | 2306.9 |
| 24 | 2295.9 |
| 25 | 1915.8 |
| 26 | 1726.3 |
| 27 | 1723.0 |
| 28 | 1662.4 |
| 29 | 1656.9 |

The above measurement was carried out by using tetramethylsilane as a standard and chloroform as a solvent. The measurement with respect to the coupling of $H^1$ and $C^{13}$—H was carried out and the identification results of D coupling of $C^{13}$ was finally shown. Among the above frequencies, Nos. 14, 15 and 16 correspond to the absorption peaks of the solvent.

SYNTHETIC EXAMPLE 2

794.6 parts of a compound represented by the formula:

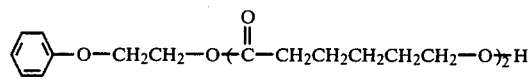

187.7 parts of acrylic acid, 15 parts of p-toluenesulfonic acid, 1.4 parts of hydroquinone, 610 parts of benzene and 153 parts of cyclohexane were placed in the same reactor as the one used in Synthetic Example 1 to carry out the reaction in a similar manner as described in Synthetic Example 1 until 39.0 parts of water was generated. The reaction temperature was 80° to 88° C. The reaction mixture was dissolved in a mixture of 1120 parts of benzene and 280 parts of cyclohexane. The solution was neutralized, washed and distilled to remove the solvent according to the same procedure as the one described in Synthetic Example 1 to obtain 775 parts of a pale yellow liquid. This liquid had the following characteristics:

| | |
|---|---|
| specific gravity (25° C.) | 1.103 |
| viscosity (25° C.) | 202.0 CPS |
| saponification value | 399.7 mgKOH/g |
| acid value | 0.02 mgKOH/g |
| refractive index (20° C.) | 1.4951 |
| elemental analysis | C (%)    H (%) |
| | 65.78    7.64 |

Results of NMR measurement

| No. | Absorption frequency (Hz) |
|---|---|
| 1 | 11738.4 |
| 2 | 11730.7 |
| 3 | 11244.9 |
| 4 | 11233.9 |
| 5 | 10728.2 |
| 6 | 8880.7 |
| 7 | 8832.2 |
| 8 | 8765.0 |
| 9 | 8702.2 |
| 10 | 8671.4 |
| 11 | 8198.7 |
| 12 | 8186.6 |
| 13 | 7757.0 |
| 14 | 5260.5 |
| 15 | 5228.6 |
| 16 | 5196.6 |
| 17 | 4682.2 |
| 18 | 4456.3 |
| 19 | 4453.0 |
| 20 | 4350.6 |
| 21 | 4336.2 |
| 22 | 4258.0 |
| 23 | 4242.6 |
| 24 | 4148.9 |
| 25 | 2305.8 |
| 26 | 2295.9 |
| 27 | 1915.8 |
| 28 | 1726.3 |
| 29 | 1723.0 |
| 30 | 1662.4 |
| 31 | 1656.9 |

Among the above frequencies, Nos. 14, 15 and 16 correspond to the absorption peaks of the solvent.

SYNTHETIC EXAMPLE 3

600 parts of a compound represented by the formula:

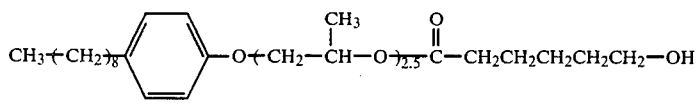

99.5 parts of acrylic acid, 3.8 parts of sulfuric acid, 2 parts of hydroquinone and 400 parts of toluene were placed in the same reactor as the one used in Synthetic Example 1 to carry out the reaction in a similar manner as described in Synthetic Example 1 until 22.6 parts of water was generated. The reaction temperature was 105° to 116° C. The reaction mixture was dissolved in 1000 parts of toluene. The solution was neutralized, washed and distilled to remove the solvent according to the same procedure as the one described in Synthetic Example 1 to obtain 541 parts of a pale yellow liquid. This liquid had the following characteristics:

| specific gravity (25° C.) | 1.0080 | |
|---|---|---|
| viscosity (25° C.) | 249 | CPS |
| saponification value | 208.6 | mgKOH/g |
| acid value | 0.02 | mgKOH/g |
| refractive index (20° C.) | 1.4865 | |
| elemental analysis | C (%) | H (%) |
| | 71.23 | 9.28 |

Results of NMR measurement

| No. | Absorption frequency (Hz) |
|---|---|
| 1 | 11751.5 |
| 2 | 11717.4 |
| 3 | 11258.0 |
| 4 | 8843.1 |
| 5 | 8836.5 |
| 6 | 8736.2 |
| 7 | 8732.9 |
| 8 | 8714.2 |
| 9 | 8648.1 |
| 10 | 8632.7 |
| 11 | 8607.3 |
| 12 | 8588.6 |
| 13 | 7724.9 |
| 14 | 7719.4 |
| 15 | 7712.8 |
| 16 | 5267.0 |
| 17 | 5235.1 |
| 18 | 5203.1 |
| 19 | 5123.8 |
| 20 | 5066.5 |
| 21 | 4975.1 |
| 22 | 4872.6 |
| 23 | 4859.4 |
| 24 | 4743.7 |
| 25 | 4717.3 |
| 26 | 4363.6 |
| 27 | 4349.3 |
| 28 | 3526.4 |
| 29 | 2950.2 |
| 30 | 2816.9 |
| 31 | 2759.6 |
| 32 | 2735.4 |
| 33 | 2542.6 |
| 34 | 2429.1 |
| 35 | 2376.2 |
| 36 | 2336.5 |
| 37 | 2320.0 |

-continued

| No. | Absorption frequency (Hz) |
|---|---|
| 38 | 2260.5 |
| 39 | 2165.8 |
| 40 | 2141.5 |
| 41 | 2132.7 |
| 42 | 2094.2 |
| 43 | 2047.9 |
| 44 | 1989.5 |
| 45 | 1951.0 |
| 46 | 1928.9 |
| 47 | 1751.5 |
| 48 | 1740.5 |
| 49 | 1736.1 |
| 50 | 1675.5 |
| 51 | 1609.4 |
| 52 | 1557.7 |
| 53 | 1544.4 |
| 54 | 1492.7 |
| 55 | 1451.9 |
| 56 | 1360.4 |
| 57 | 1313.1 |
| 58 | 1265.7 |
| 59 | 1184.2 |
| 60 | 1143.4 |
| 61 | 1016.7 |
| 62 | 993.6 |
| 63 | 977.1 |
| 64 | 964.9 |
| 65 | 784.3 |
| 66 | 733.6 |
| 67 | 595.9 |
| 68 | 12.0 |

Among the above frequencies, Nos. 16, 17 and 18 correspond to the absorption peaks of the solvent.

SYNTHETIC EXAMPLE 4

760 parts of a compound represented by the formula:

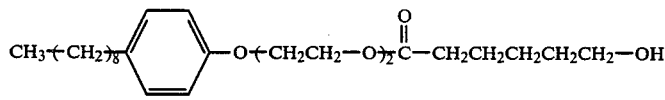

160 parts of acrylic acid, 4.7 parts of sulfuric acid, 1.2 parts of hydroquinone, 576 parts of benzene and 144 parts of cyclohexane were placed in the same reactor as the one used in Synthetic Example 1 to carry out the reaction in a similar manner as described in Synthetic Example 1 until 32.4 parts of water was generated. The reaction temperature was 81° to 87° C. The reaction mixture was dissolved in a mixture of 1482.4 L parts of benzene and 370.6 parts of cyclohexane. The solution was neutralized, washed and distilled to remove the solvent according to the same procedure as the one described in the Synthetic Example 1, thus obtaining 601.5 parts of a pale yellow liquid. This liquid had the following characteristics:

| specific gravity (25° C.) | 1.420 | |
|---|---|---|
| viscosity (25° C.) | 193 | CPS |
| saponification value | 263.8 | mgKOH/g |
| acid value | 0.02 | mgKOH/g |
| refractive index (20° C.) | 1.4919 | |

| elemental analysis | C (%) | H (%) |
|---|---|---|
| | 70.93 | 8.90 |

Results of NMR measurement

| No. | Absorption frequency (Hz) |
|---|---|
| 1 | 11743.8 |
| 2 | 11739.4 |
| 3 | 11250.3 |
| 4 | 11244.8 |
| 5 | 10587.1 |
| 6 | 8866.2 |
| 7 | 8838.7 |
| 8 | 8708.7 |
| 9 | 8692.2 |
| 10 | 8660.2 |
| 11 | 8642.6 |
| 12 | 8627.2 |
| 13 | 8601.8 |
| 14 | 8595.2 |
| 15 | 8583.1 |
| 16 | 7721.6 |
| 17 | 7715.0 |
| 18 | 7708.4 |
| 19 | 7702.8 |
| 20 | 5267.0 |
| 21 | 5235.1 |
| 22 | 5203.1 |
| 23 | 4798.8 |
| 24 | 4787.8 |
| 25 | 4784.5 |
| 26 | 4732.7 |
| 27 | 4690.8 |
| 28 | 4687.5 |
| 29 | 4683.1 |
| 30 | 4558.6 |
| 31 | 4357.0 |
| 32 | 4342.7 |
| 33 | 4316.3 |
| 34 | 4298.6 |
| 35 | 3522.0 |
| 36 | 3442.6 |
| 37 | 2945.8 |
| 38 | 2810.3 |
| 39 | 2755.2 |
| 40 | 2729.8 |
| 41 | 2537.0 |
| 42 | 2422.5 |
| 43 | 2369.6 |
| 44 | 2313.4 |
| 45 | 2305.7 |
| 46 | 2256.1 |
| 47 | 2160.3 |
| 48 | 2134.9 |
| 49 | 2125.0 |
| 50 | 2087.6 |
| 51 | 2075.4 |
| 52 | 2041.3 |
| 53 | 1985.1 |
| 54 | 1980.7 |
| 55 | 1944.3 |
| 56 | 1923.4 |
| 57 | 1827.6 |
| 58 | 1746.0 |
| 59 | 1733.9 |
| 60 | 1731.7 |
| 61 | 1670.0 |
| 62 | 1664.5 |
| 63 | 1602.8 |
| 64 | 1552.1 |
| 65 | 1540.0 |
| 66 | 1487.1 |
| 67 | 1476.1 |
| 68 | 1445.3 |
| 69 | 1354.9 |
| 70 | 1308.7 |
| 71 | 1204.0 |
| 72 | 1011.2 |
| 73 | 989.2 |
| 74 | 972.7 |
| 75 | 960.5 |
| 76 | 766.6 |
| 77 | 729.2 |
| 78 | 591.5 |

Among the above frequencies, Nos. 20, 21 and 22 correspond to the absorption peaks of the solvent.

SYNTHETIC EXAMPLE 5

593 parts of a compound represented by the formula:

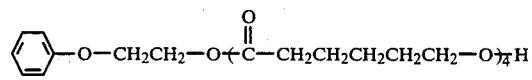

103.2 parts of methacrylic acid, 2.9 parts of sulfuric acid, 1.0 part of hydroquinone, 480 parts of benzene and 120 parts of cyclohexane were placed in the same reactor as the one used in Synthetic Example 1 to carry out the reaction in a similar manner as described in Synthetic Example 1 until 18 parts of water was generated. The reaction temperature was 80° to 87° C. The reaction mixture was dissolved in a mixture of 1140 parts of benzene and 285 parts of cyclohexane. The solution was neutralized, washed and distilled to remove the solvent according to the same procedure as the one described in Synthetic Example 1, thus obtaining 575 parts of a pale yellow wax. This wax had the following characteristics:

| saponification value | 422.9 mgKOH/g | |
|---|---|---|
| acid value | 0.02 mgKOH/g | |
| elemental analysis | C (%) | H (%) |
| | 65.38 | 8.25 |

Results of NMR measurement

| No. | Absorption frequency (Hz) |
|---|---|
| 1 | 11738.4 |
| 2 | 11730.7 |
| 3 | 9236.5 |
| 4 | 8765.0 |
| 5 | 8523.7 |
| 6 | 8474.2 |
| 7 | 8198.7 |
| 8 | 7762.5 |
| 9 | 7757.0 |
| 10 | 5261.6 |
| 11 | 5229.7 |
| 12 | 5197.7 |
| 13 | 4457.4 |
| 14 | 4360.5 |
| 15 | 4337.3 |
| 16 | 4271.2 |
| 17 | 4242.6 |
| 18 | 2306.9 |
| 19 | 2297.0 |
| 20 | 1918.0 |
| 21 | 1731.8 |
| 22 | 1727.4 |
| 23 | 1724.1 |
| 24 | 1662.4 |
| 25 | 1658.0 |
| 26 | 1238.3 |
| 27 | 0.0 |

Among the above frequencies, Nos. 10, 11 and 12 correspond to the absorption peaks of the solvent.

APPLIED EXAMPLES 1 TO 5

40 parts of an epoxy acrylate resin, obtained by esterifying Epikote 828 (an epoxy resin of bisphenoltype; a product of Shell Petrochemicals) with acrylic acid, and 5 parts of Darocur—1173 ( a product of E. Merck Co., Ltd.) as a photopolymerization initiator were added to 60 parts of each of the novel (meth)acrylates obtained in Synthetic Examples 1 to 5. The resulting mixture was applied on a steel panel and cured by ultraviolet-light irradiation by the use of a high-voltage mercury vapor lamp (a product of Toshiba Corporation; 2 KW). The results are shown in Table 1.

TABLE 1

| No. | (Meth)acrylate | Curing time [1] (sec) |
| --- | --- | --- |
| Applied Example 1 | obtained in Synth. Ex. 1 | 0.7 |
| Applied Example 2 | obtained in Synth. Ex. 2 | 1.0 |
| Applied Example 3 | obtained in Synth. Ex. 3 | 1.2 |
| Applied Example 4 | obtained in Synth. Ex. 4 | 1.2 |
| Applied Example 5 | obtained in Synth. Ex. 5 | 4.2 |

SYNTHETIC EXAMPLES OF POLYURETHANE ACRYLATE (B)

SYNTHETIC EXAMPLE 6

964.47 parts of polypropylene glycol (molecular weight: about 3000, OH value; 34.9 mgKOH/g) and 150.16 parts of 4,4'-diphenylmethane diisocyanate were placed in a 2 l reactor fitted with a stirrer, a thermostat, a thermometer and a condenser to carry out the reaction at 75° C. for 10 hours. The reaction mixture was cooled to 60° C. 74.56 parts of 2-hydroxyethyl acrylate, 0.59 part of methoquinone and 0.24 parts of di-n-butyltin dilaurate were added to the reaction mixture. The resulting mixture was heated to carry out the reaction at 75° to 80° C., until the amount of free isocyanate group reached about 0.1% or below, thus obtaining an adduct of an adduct of polypropylene glycol with 4,4'-diphenylmethane diisocyanate with hydroxyethyl acrylate. This adduct had the following characteristics:

| viscosity (60° C.) | 137.5 P |
| --- | --- |
| refractive index (20° C.) | 1.4800 |

SYNTHETIC EXAMPLE 7

787.36 parts of polytetramethylene glycol (molecular weight: about 2000, OH value: 57) was placed in the same reactor as the one used in Synthetic Example 6, followed by heating to 60° C. 104.4 parts of tolylene diisocyanate was dropwise added to the reactor, followed by heating to carry out the reaction at 80° C. for 10 hours. The reaction mixture was cooled to 60° C. 45.02 parts of 2-hydroxyethyl acrylate, 0.46 part of methoquinone and 0.18 part of di-n-butyltin dilaurate were added to the reaction mixture, followed by heating to carry out the reaction at 80° C. An adduct of an adduct of polytetramethylene glycol with tolylene diisocyanate with hydroxyethyl acrylate was obtained as a product. This product had the following characteristics:

| viscosity (60° C.) | 460 P |
| --- | --- |
| refractive index (20° C.) | 1.4850 |

SYNTHETIC EXAMPLE 8

253.1 parts of polypropylene glycol (molecular weight: about 2000, OH value: 56.1), 251.3 parts of polyesterpolyol obtained by reacting neopentyl glycol and adipic acid with ε-caprolactone (Placcel L-220AL, molecular weight: about 2000, OH value: 575, a product of Daicel Ltd.) and 84.7 parts of isophorone diisocyanate were placed in the same reactor as the one used in Synthetic Example 6, followed by heating to carry out the reaction at 75° C. for 10 hours. The reaction mixture was cooled to 60° C. 91.4 parts of ε-caprolactone-β-hydroxyethyl acrylate (Placcel FA-2; a product of Daicel Ltd.), 0.3 part of methoquinone and 0.12 part of di-n-butyltin dilaurate were added to the reaction mixture. The resulting mixture was heated to carry out the reaction at 75° to 80° C. The resulting product had the following characteristics:

| viscosity (60° C.) | 110 P |
| --- | --- |
| refractive index (20° C.) | 1.4721 |

EXAMPLES OF ULTRAVIOLET-CURING RESIN COMPOSITION

EXAMPLE 1

30 parts of a polymerizable monomer obtained in Synthetic Example 1, 30 parts of a polymerizable monomer obtained in Synthetic Example 2, 40 parts of polyurethane acrylate obtained in Synthetic Example 6, 5 parts of 1-hydroxycyclohexyl phenyl ketone and 0.01 part of methylhydroquinone were mixed to prepare a resin composition A. The characteristics of the composition A are shown in Table 2.

EXAMPLE 2

60 parts of a polymerizable monomer obtained in Synthetic Example 2, 40 parts of polyurethane acrylate obtained in Synthetic Example 8, 5 parts of 4'-dodecyl-2-hydroxy-2-methylpropiophenone (Darocur-953, a product of E. Merck Co., Ltd.) and 0.01 part of methylhydroquinone were mixed to prepare a resin composition B. The characteristics of the composition B are shown in Table 2.

EXAMPLE 3

10 parts of a polymerizable monomer obtained in Synthetic Example 1, 50 parts of a polymerizable monomer obtained in Synthetic Example 3, 10 parts of ε-caprolactone-β-hydroxyethyl acrylate (Placcel FA-2, a product of Daicel Ltd.), 30 parts of polyurethane acrylate obtained in Synthetic Example 7, 5 parts of 1-hydroxycyclohexyl phenyl ketone (Irgacure 154; a product of Ciba-Geigy) and 0.01 part of methylhydroquinone were mixed to prepare a resin composition C. The characteristics of the composition C are shown in Table 2.

EXAMPLE 4

60 parts of a polymerizable monomer obtained in Synthetic Example 4, 10 parts of phenoxyethyl acrylate, 30 parts of polyurethane acrylate obtained in Synthetic Example 8, 5 parts of Darocure-953 and 0.01 part of methylhydroquinone were mixed to prepare a resin composition D. The characteristics of the composition D are shown in Table 2.

COMPARATIVE EXAMPLE 5 parts of 2-ethyl-4-methylimidazole was dissolved in 100 parts of epoxy resin Epikote 828 (a product of Shell Chemical) to prepare a resin composition E. The characteristics of the composition E are shown in Table 2.

TABLE 2

| | Resin composition | | | | |
| --- | --- | --- | --- | --- | --- |
| | A | B | C | D | E |
| Viscosity (CPS/25° C.) | 1600 | 3800 | 4400 | 4800 | 15000 |
| Curing time (sec/150° C.) | — | — | — | — | 59 |
| Curing time (sec/mercury tape) 80 w/cm | 0.2 | 0.2 | 0.2 | 0.2 | — |
| Hardness (Shore A) | 49 | 42 | 43 | 43 | ≧100 |
| Glass transition temperature (°C.) | −40 | −46 | −46 | −43 | 115 |

The measurement of curing time in the above Table 2;

With respect to the compositions A, B, C and D, the composition was applied on a glass plate and irradiated with a high-voltage mercury vapor lamp (input 80 W/cm, lamp output 2 kW) which was placed in parallel with the conveyor and at a height of 8 cm from the conveyor (conveyor speed; 50 cm/min) to measure the irradiation time required for the coating film to become dry in a nitrogen atmosphere. With respect to the composition E, the time required for the coating film to gel by heating at 150° C. was measured.

The measurement of Shore hardness A;

With respect to the compositions A, B, C and D, a sheet of a thickness of 250 μm was prepared by irradiation with a high-voltage mercury vapor lamp (input 80 W/cm, lamp output 2 kW) which was placed in parallel with the conveyor and at a height of 8 cm from the conveyor (conveyor speed; 50 m/min). The measurement was carried out with this sheet. With respect to the composition E, the composition was cured by heating at 150° C. for 15 minutes to prepare a plate of a thickness of 2 mm. The measurement was carried out with this plate. The measurement was carried out according to JIS-Z 2246.

The measurement of glass transition temperature;

Sheets and a plate were prepared according to the same procedure as the one described in "The measurement of Shore hardness A". These sheets and plate were measured for glass transition temperature by the use of a viscoelastic spectrometer (made by Iwamoto Manufacturing Co., Ltd.)

EXAMPLE 5

Optical glass fibers drawn to a diameter of 125 μm at a rate of 5 m/second were immediately coated with the Compositions A, B, C and D respectively and each coatings was cured by irradiation of ultraviolet light (high-voltage mercury vapour lamp, lamp output: 2 KW). In each case, no increase in transmission loss was observed even at −40° C.

The novel (meth)acrylate of the present invention is useful as a vehicle for coating or ink composition and can be cured by irradiation with ultraviolet ray or raidation, or by heating.

The resin composition of the present invention exhibits a low viscosity and a high curing speed and can give a coating film which is flexible, low water absorption rate and has a low glass transition temperature, so that it is suitable for coating an optical glass fiber for light transmission. A coating film obtained by using the resin composition of the present invention shows excellent adhesion properties to an optical glass fiber.

Further, the resin composition of the present invention have very low levels of skin toxicity and is free from strong odors.

We claim:

1. A (meth)acrylate represented by the general formula:

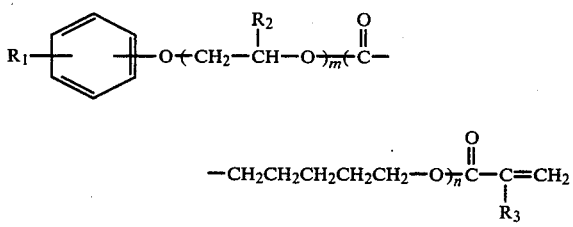

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10.

2. A (meth)acrylate as set forth in claim 1 wherein $R_1$ stands for a hydrogen atom or an alkyl group having 1 to 10 carbon atoms and the mean value of m is 1 to 5.

3. A (meth)acrylate as set forth in claim 1 or 2 wherein $R_1$ stands for a hydrogen atom or a nonyl or octyl group.

4. A (meth)acrylate as set forth in claim 1 or 2 wherein the mean value of m is 1 to 3 and the mean value of n is 1 to 2.

5. A (meth)acrylate as set forth in claim 1 or 2 wherein $R_3$ stands for a hydrogen atom.

6. A resin composition comprising (A) a compound represented by the general formula:

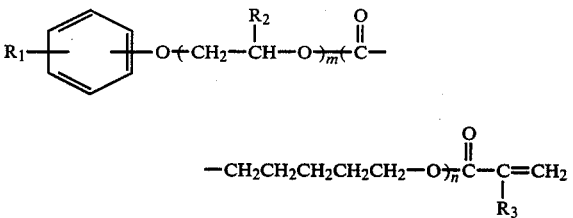

wherein $R_1$ stands for a hydrogen atom or an alkyl group having 1 to 12 carbon atoms; $R_2$ and $R_3$ each stand for a hydrogen atom or a methyl group; the mean value of m is 1 to 10 and the mean value of n is 1 to 10, (B) a polyurethane acrylate and (C) a photopolymerization initiator.

7. A resin composition as set forth in claim 6 wherein the amount of the polyurethane acrylate (B) is 30 to 200 parts by weight per 100 parts by weight of compound (A) and the amount of the photopolymerization initiator (C) is 0.1 to 10% by weight based on the resin composition.

8. A resin composition as set forth in claim 6 or 7 wherein $R_1$ stands for a hydrogen atom or an alkyl group having 1 to 10 carbon atoms and the mean value of m is 1 to 5.

9. A resin composition as set forth in claim 6 or 7 wherein $R_1$ stands for a hydrogen atom or a nonyl or octyl group.

10. A resin composition as set forth in claim 8 wherein the mean value of m is 1 to 3 and the mean value of n is 1 to 2.

11. A resin composition as set forth in claim 6 or 7 wherein $R_3$ stands for a hydrogen atom.

12. A resin composition as set forth in claim 6 or 7 wherein the polyurethane acrylate has an average molecular weight of 1000 to 10000.

13. A coating for an optical glass fiber comprising the resin composition as set forth in claim 6 or 7.

14. A coating for an optical glass fiber comprising the resin composition as set forth in claim 8.

15. A coating for an optical glass fiber comprising the resin composition as set forth in claim 11.

* * * * *